United States Patent [19]

Fink

[11] 4,340,898
[45] Jul. 20, 1982

[54] BARRIER-LAYER CAPACITOR AND PROCESS FOR THE PRODUCTION THEREOF

[75] Inventor: Rudolf Fink, Selb, Fed. Rep. of Germany

[73] Assignee: Draloric Electronic GmbH, Fed. Rep. of Germany

[21] Appl. No.: 36,415

[22] Filed: May 7, 1979

[30] Foreign Application Priority Data

Oct. 21, 1978 [DE] Fed. Rep. of Germany ....... 2845931
Nov. 24, 1978 [DE] Fed. Rep. of Germany ....... 2850845

[51] Int. Cl.³ .......................................... H01L 29/92
[52] U.S. Cl. ....................................... 357/10; 357/14; 357/68; 357/71; 361/310; 361/322
[58] Field of Search ...................... 357/10, 14, 68, 65, 357/71; 361/308, 309, 310, 321, 322

[56] References Cited

U.S. PATENT DOCUMENTS

| | | | |
|---|---|---|---|
| 3,274,468 | 9/1966 | Rodriquez et al. | 361/321 |
| 3,676,757 | 7/1972 | Ramisch | 361/308 |
| 3,967,167 | 6/1976 | Scharrer et al. | 361/321 |
| 4,221,033 | 9/1980 | Kobayashi | 361/310 |

FOREIGN PATENT DOCUMENTS 2320482 10/1974 Fed. Rep. of Germany ...... 361/321
2404758 8/1975 Fed. Rep. of Germany .

*Primary Examiner*—William D. Larkins

[57] ABSTRACT

A barrier layer capacitor and a process for producing that capacitor: A central reduction layer formed of ceramic material is produced with a rectangular cross-section. A reoxidation layer is formed on all of the surfaces and is removed from one of the surfaces. Grooves are formed in opposite surfaces, including the one from which the reoxidation layer has been removed. A metal layer is applied around the entire capacitor body, except on the surface from which the reoxidation layer has been removed. Narrow strips are removed from the metal layer on the sides adjacent the surface without the reoxidation layer and at a location slightly away from that reoxidation layer free surface. On the reoxidation layer free surface, a connection coating is applied which extends up to the unremoved portion of the solderable metal coating. The capacitor may be cut from an elongated bar. The bar from which the capacitor may be cut may be the width of two capacitors and it may be separated along the line running through the center into two individual capacitors. In that event, the ceramic bar has a longitudinally extending borehole therethrough which becomes the conductor receiving grooves upon separation of the bar into two pieces.

8 Claims, 10 Drawing Figures

BARRIER-LAYER CAPACITOR AND PROCESS FOR THE PRODUCTION THEREOF

The present invention relates to a barrier layer capacitor and to a process for the production thereof.

BACKGROUND OF THE INVENTION AND DESCRIPTION OF PRIOR ART

Such a capacitor is described in German Unexamined Patent Application (Offenlegungsschrift) No. 14 64 695. In particular, in FIG. 4 of that application and in the corresponding description, a disc-shaped barrier layer capacitor is shown in which a reoxidation layer on one main surface of the capacitor is ground away.

A process for producing a barrier layer capacitor in which formation of a reoxidation layer on a main surface of the capacitor body is avoided in advance is known from German Patent No. 12 82 791. In that case, two discs of semi-conductive material are detachably connected by a non-oxidizing substance before the application of the barrier layer free coatings. In both of the above mentioned cases, the reduction layer extends to a main surface of the disc-shaped capacitor body.

A barrier layer capacitor in which the reduction layer extends to the outer surface of the disc-shaped capacitor body is known from U.S. Pat. No. 3,133,338. Particularly in FIG. 7 and in the corresponding description, a circuit arrangement of barrier layer capacitors is disclosed. The reduction layer extends to the entire outer surface of the disc-shaped capacitor body and is contacted free of a barrier layer there. In this case, grinding or cutting is necessary along the entire outer surface.

Applicant's German Provisional Patent (Auslegeschrift) No. 2 320 482 discloses a barrier layer capacitor in which the reduction layer extends only to a part of the outer surface of a disc-shaped capacitor body. It is provided there with a barrier layer free electrode coating. A second electrode coating covers at least both main surfaces of the capacitor body, except for a coating free region which extends parallel to the barrier layer free coating surface. Although the capacitor body is relatively easy to produce, the electric contacting is problematical because of the de-doping resistance at the barrier layer free coating surface.

Also known in the art is a ceramic capacitor having a capacitor body with a cross-section that is developed in the shape of a flat tube. The body has a central inner borehole. On the outer grounding surface of the body, metal layers are the coatings or electrodes of the capacitor. These are known from German Provisional Patent (Auslegeschrift) No. 1 904 677, German Unexamined Application for Patent (Offenlegungsschrift) No. 2 043 770, German Provisional Patent (Auslegeschrift) No. 2 345 000 and German Utility Model (Gebrauchsmuster) No. 7 101 847. However, in all of these known forms of capacitors having a cross-section in the shape of a flat tube, the central inner bore contains a metal coating and a capacitor connection. The introduction of both these is difficult during manufacture. As a result, the connection elements do not extend symmetrically away from the capacitor body.

In the capacitor shown in German Provisional Patent (Auslegeschrift) No. 2 345 000, a capacitor connection in the inner bore is not absolutely necessary. In such a case, however, the total capacitance between the two capacitor connections is relatively small as a result of the series connection of two individual capacitances.

German Unexamined Application for Patent (Offenlegungsschrift) No. 2 404 758 discloses a process for mass producing electric components. The body of such a component has a solid rectangular cross-section. There is a longitudinal groove on each of two opposite narrow sides of the body. A connecting element is fastened into each groove. However, that application relates to resistors or ceramic capacitors and not to the barrier layer capacitors of the present invention.

U.S. Pat. No. 3,001,106 discloses a compact circuit system having connection components with asymmetrical and symmetrical cross-sectional profiles in the form of a flat tube, as shown in FIGS. 2 and 2d thereof. In that case also, a connecting element is contained in the inner bore and the disclosure does not concern a barrier layer capacitor.

SUMMARY OF THE INVENTION

The primary object of the invention is to provide a barrier layer capacitor, including a central reduction core and a reoxidation layer surrounding it, which capacitor is simple to manufacture. In this capacitor there is a connecting element that is connected with the barrier layer free connection coating. It is another object of the invention to simplify contacting between the connecting element and the barrier layer free connection coating because such contacting is not effected directly on the barrier layer free connecting layer but instead is done on a solderable metal layer.

Advantages of the invention include the facts that the capacitor bodies can be produced in simple manner by extrusion, that the electrode coatings can be applied in a simple manner, and that the connecting elements are applied in a very simple manner, with good electrical conductivity and mechanical strength, to the solderable electrode coatings and that the connecting elements protrude symmetrically from the body of the capacitor.

Other objects and features of the invention are shown in the accompanying drawings and described in the following description.

BRIEF DESCRIPTION OF THE DRAWINGS

FIGS. 2a to 2c show individual steps in a second process for producing a barrier layer capacitor using a double width bar;

DESCRIPTION OF THE PREFERRED EMBODIMENTS

Figure 1A:
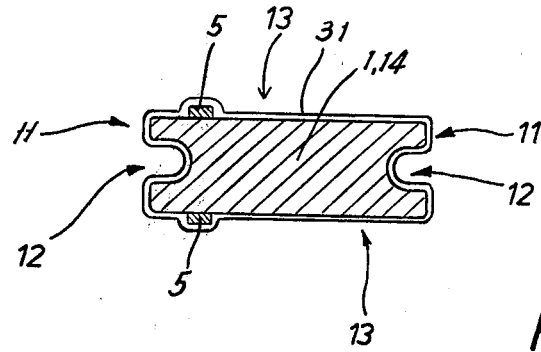
FIGS. 1a to 1c show individual steps in one process for producing a barrier layer capacitor from a ceramic bar.

FIG. 1a shows a ceramic bar 1, comprised of modified barium titanate or other known non-conductive capacitor ceramic, of rectangular cross-section which has been densely sintered and thereafter completely reduced throughout (bar 14), to get a conductive ceramic bar 1, 14. On its two opposite narrow sides 11, the bar 1 has longitudinal grooves 12 whose cross-sections are narrow and rounded and are thereby adapted to the cross-section of the capacitor connections 21, 22 to be fastened therein. On each of the two opposite, principal surfaces 13 of the bar, there is a bonded on strip 5 which extends parallel to one narrow side 11 of the bar, in the vicinity of that side or which may even extend up to the narrow side 11 itself. A layer 31 of a solderable metal covers the entire surface of the ceramic bar 1, 14.

Figure 1B:
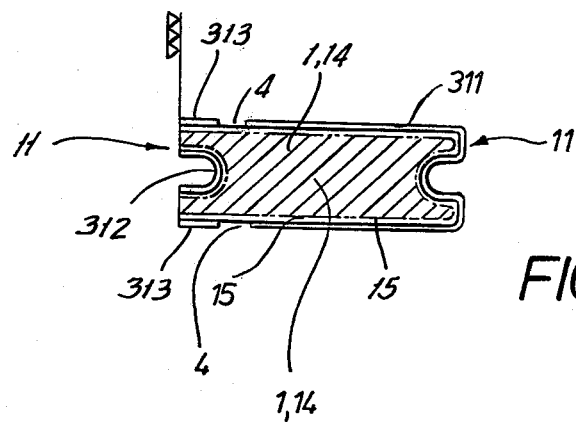

FIG. 1b shows the ceramic bar 1, 14 after the covering strips 5 have been removed. This produces one metal layer 311 which extends from one principal surface 13 of the bar, over a narrow side 11 thereof and through the respective longitudinal groove 12 therein to the other principal surface 13. The metal layer 311 covers the major portion of the surfaces 13 because of the location of the strips 5. Removal of the strips 5 produces further, smaller area metal layers 313 on the surfaces 13. The metal layer 313 is also removed from the surface 11, in the manner described below, leaving a solderable metal layer 312 remaining in the second longitudinal groove 12.

After the dividing by cutting of the ceramic bar into individual capacitor bodies 1, 14, the metal layer 311, 312, 313 is subjected to a reoxidizing firing so as to form a reoxidation layer 15 below the surface of the capacitor body 1. This layer acts as a dielectric. It has a thickness of the order of magnitude of about 10 $\mu$m.

The narrow side 11 of the body 1, 14 at the layers 313 is thereupon ground, as is indicated in FIG. 1b by three triangles, in such a manner that the layer 313 and the reoxidation layer 15 beneath it is removed from the side 11 so that the conductive reduction core 14 extends up to the surface at this narrow side.

Figure 1C:
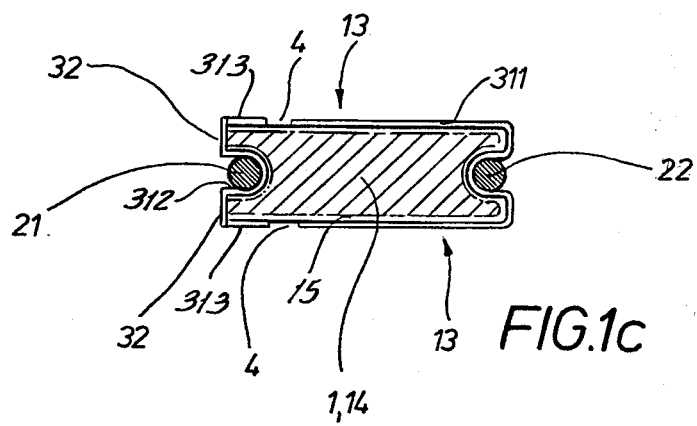

Referring to FIG. 1c, a barrier layer free connecting coating 32 is printed on the narrow side 11 at which the reduction core 14 extends to the surface of the ceramic body 1. This connecting coating 32 is laid on and electrically conductively connected with the solderable metal layer 312 in the longitudinal groove 12. Capacitor connections or terminal leads 21, 22 are placed into the respective longitudinal grooves 12 and are soldered firmly to the metal layers 32 and 311, respectively.

Figure 2A:
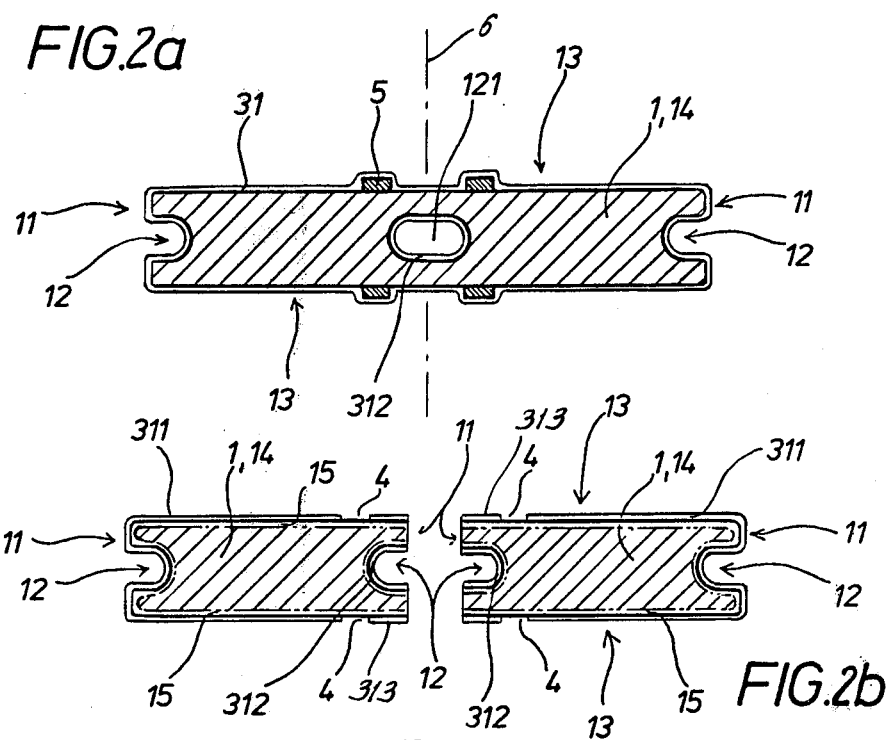

FIG. 2a shows a densely sintered, completely reduced, conductive, double body width ceramic bar 1, 14 of rectangular cross-section. It has a central, longitudinally extending borehole 121 and a longitudinal groove 12 on each of the opposite narrow sides 11 of the bar. The cross-section of the central borehole 121 corresponds to the cross-section of two adjoining longitudinal grooves 12 or is somewhat larger than same in order to compensate for the cutting waste. Onto the bar 1, 14, on both of its principal surfaces 13, there are bonded two covering strips 5 or one covering strip 5 each, which are spaced away symmetrically from the section line 6, shown in dot-dash line, or concentrically to the section line 6. The bar 1, 14 is completely covered on the outer surface and in the central borehole 121 with a solderable metal layer 31, 312. Then the cover strips 5 are removed from the bar 1, 14. The bar 1, 14 is divided across the longitudinal direction into individual sections of the width of two ceramic bodies.

Figure 2B:
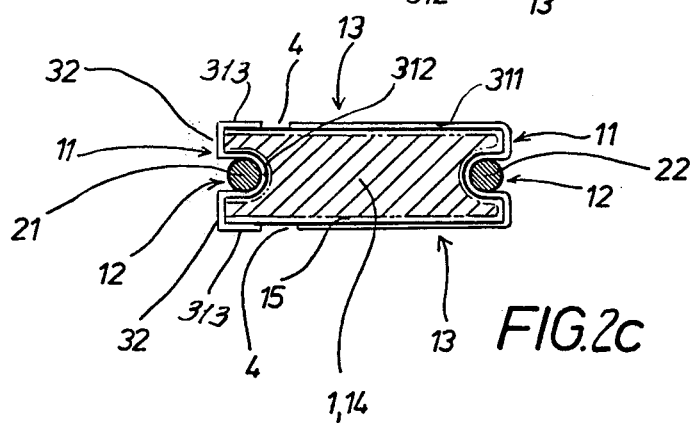

Subsequent reoxidizing firing of the solderable metal layer 311, 312, 313 forms a reoxidation layer 15 of a thickness on the order of magnitude of 10 $\mu$m below the entire surface of the sections wich acts as a dielectric. The sections are thereafter separated by being cut or snapped apart, along the section line 6 of FIG. 2a, across and through the borehole 121 as shown in FIG. 2b.

FIG. 2c shows a capacitor body 1 whose narrow side 11 is formed by the cut along the line 6 (FIG. 2a). The conductive reduction core extends to that narrow side 11. That narrow side 11 is covered with a barrier layer free connecting coating 32, which is conductively connected with the solderable metal layer 312 in the longitudinal groove 12. As in the first embodiment, the capacitor connections 21, 22 are inserted into the longitudinal groove 12 and are soldered to the metal layers 311 and 312, respectively.

It is also possible to allow the metal free strips 4 to extend over the center of the principal surfaces 13 and not to provide wire connections. In this case, a chip capacitor is obtained in a simple fashion. This chip capacitor can be soldered directly into an electric circuit by means of the separated metal layers 313 and 311.

Figure 3A:
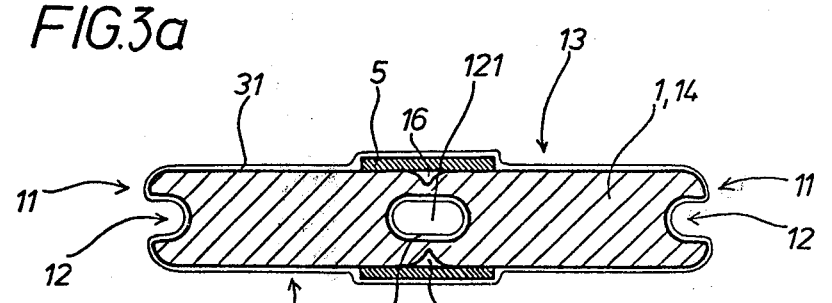
FIGS. 3a to 3c show the steps in a third process for producing a barrier layer capacitor also using a double width bar.

FIG. 3a shows a double body width, densely sintered, completely reduced ceramic bar 1, 14 of rectangular cross-section which has a central borehole 121, a central longitudinally extending notch 16 on each of the opposite principal surfaces 13, and a longitudinal groove 12 formed in each of the opposite narrow sides 11 of the bar 1. The cross-section of the central borehole 121 corresponds to the cross-section of two adjoining longitudinal grooves 12. Onto both of the principal surfaces 13 of the bar 1, 14, there is bonded a covering strip 5 which extends above the central longitudinal notch 16. The bar 1 is completely covered with a solderable metal layer 31, 312 on the outer surface and in the central borehole 121, respectively. Thereupon, the covering strips 5 are removed from the reduced bar 1. The bar 1 is divided into individual double width sections across the longitudinal direction.

Figure 3B:
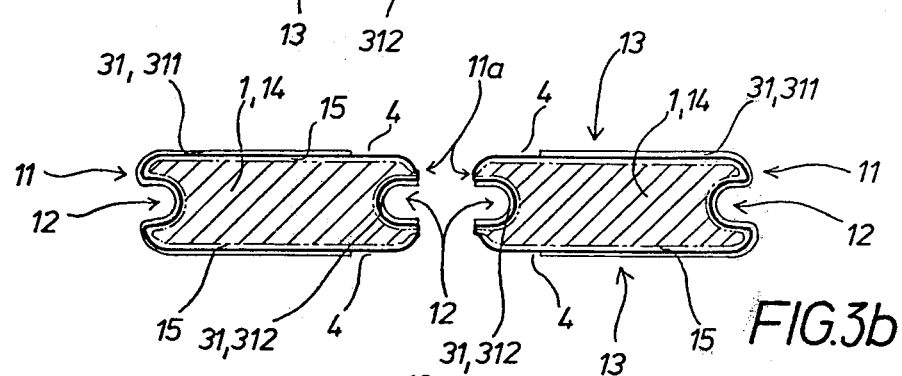

Reoxidizing firing of the solderable metal layers 311, 312 forms a reoxidation layer 15 of a thickness on the order of magnitude of 10 $\mu$m below the entire surface of the sections. Then the sections are separated by fracture thereof along the plane defined by the longitudinal notches 16, as shown in FIG. 3b.

Figure 3C:
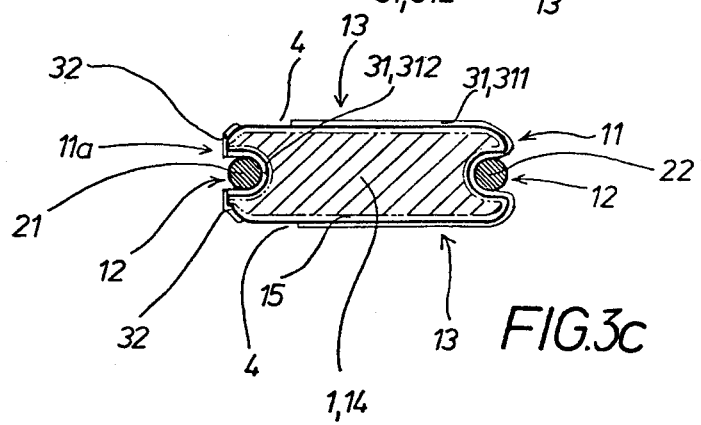

FIG. 3c shows a capacitor body 1 that has a fracture surface 11a formed by the fracture along the longitudinal notches 16 (FIG. 3a). The conductive reduction core 14 extends to the surface 11a. The surface is covered with a barrier layer free connecting coating 32 which is conductively connected with the solderable metal layer 312 in the longitudinal groove 12. The capacitor connections 21, 22 are inserted into the longitudinal grooves 12 and are soldered to the metal layers 311 and 312, respectively.

Figure 4:
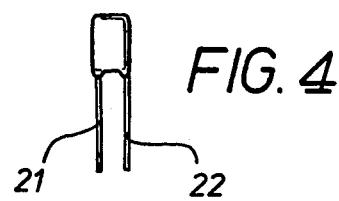
FIG. 4 shows a surrounded barrier layer capacitor in approximately actual size.

FIG. 4 shows a barrier layer capacitor formed as above and thereafter surrounded by an electrically insulating composition and having the two capacitor connections 21, 22 extending parallel to each other at a raster distance apart.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A barrier layer capacitor, comprising:
   a central, conductive ceramic bar having a substantially rectangular cross section defined by first and second opposite side surfaces having third and fourth side surfaces extending therebetween;
   a reoxidation barrier layer formed on almost all of said side surfaces;
   said first side surface including a first portion at which said reoxidation barrier layer is formed and a second portion at which said reoxidation barrier layer is not formed;

a first terminal lead receiver being defined at said first portion of said first side surface;

a first solderable metal coating covering said first portion of said first side surface;

a barrier layer free connection coating extending from said first solderable metal coating to said second section of said first surface such that said barrier layer free connection is in direct contact with said central, conductive ceramic bar and said first solderable metal is in electrical contact with said central, conductive ceramic bar;

a first terminal lead being fastened on said first solderable metal coating;

a second solderable metal coating extending over most of said second, third and fourth side surfaces;

a second terminal receiver being defined at said second surface at a location where said reoxidation barrier layer is formed and being covered by said second solderable metal coating; and a second terminal lead being fastened on said second solderable metal coating at said second conductor receiver.

2. The capacitor of claim 1, wherein said reoxidation layer surrounds all said surfaces of said reduction body except said first surface thereof and on said first surface, said reoxidation layer being substantially only at said first section thereof.

3. The capacitor of claim 1, further comprising a further metal coating on said third and fourth side surfaces; said further metal coating contacting said connection coating and being separated by a gap from said second metal coating located on said third and fourth side surfaces.

4. The capacitor of claim 3, wherein said reoxidation layer surrounds all said surfaces of said reduction body except said first surface thereof and on said first surface, said reoxidation layer being substantially only at said first section thereof.

5. The capacitor of claim 1, wherein said first and said second side surfaces are narrower in width than said third and fourth side surfaces.

6. The capacitor of either of claims 1 or 3, wherein said first and said second terminal lead receivers comprise respective first and second longitudinal groove formed in said first and said second side surfaces.

7. The capacitor of claim 6, wherein said first and said second conductors conform in cross-section to the cross-section of said first and said second grooves, respectively.

8. The capacitor of either of claims 1 or 4 wherein said first surface is a fracture surface.

* * * * *